Aug. 31, 1948.  J. A. CAMPBELL  2,448,251
LIQUID LEVEL CONTROL
Filed May 15, 1946

JULIAN A. CAMPBELL
INVENTOR.

BY Hadwin White
ATTORNEY

Patented Aug. 31, 1948

2,448,251

UNITED STATES PATENT OFFICE 2,448,251

LIQUID LEVEL CONTROL

Julian A. Campbell, Long Beach, Calif.

Application May 15, 1946, Serial No. 669,859

16 Claims. (Cl. 200—84)

This invention relates generally to equipment for effecting controls in response to variations in liquid levels, as for example in the regulation of boiler feed water delivery in accordance with the position of the boiler water level.

The invention has for its major object to provide improvements in float controls of the general type employing magnetically actuated parts responsive to the float movements to regulate the operation of secondary controls (pumps, valves or the like) which govern liquid delivery to a chamber or boiler. Characteristically the invention represents various important advances in this type of control equipment, primarily with respect to its simple and economical form, and capacity for direct and reliable action to maintain liquid with but slight variations from a predetermined level.

In accordance with the invention, I employ a suitable form of liquid surge chamber, and provide for the transmission of magnetic force or field through a closed side wall of the chamber, to actuate an exterior control part in response to the liquid level changes in the chamber. As will appear, one distinct advantage of the concept of magnetic force transmission through the liquid-contacted side wall of the chamber, is that it permits the use of a freely displaceable and sensitive float carrying a magnetic metal element which governs the control simply by movement into and out of the magnet field.

More specifically, the invention contemplates the use outside the chamber wall, of a movable magnet control part normally maintained in one position, from which it is displaceable by movement of the float carried magnetic metal element into the magnet field transmitted through the chamber wall. Provision is made for mounting the exterior control parts, for example a magnet and switch assembly, on the chamber for vertical adjustment relative to the interior liquid level, thus permitting variations of the position at which the level is to be maintained.

Further objects of the invention have to do particularly with the form of the float and magnetic metal element carried thereby. One embodiment contemplates the use of a spherical float carrying a magnetic metal annulus and associated means for assuring sensitivity of the float displacement notwithstanding the magnetic attraction to which the annulus is subjected. Another embodiment particularly adaptable for use in high pressure chambers, contemplates the use of a solid non-magnetic float, magnetic metal element carried thereby, and associated compensating spring, all as will appear.

The above mentioned as well as various additional features and objects of the invention will be understood and explained to better advantage by reference to the accompanying drawing illustrating the invention in certain typical embodiments. In the drawing.

Figures 1, 2, 3:
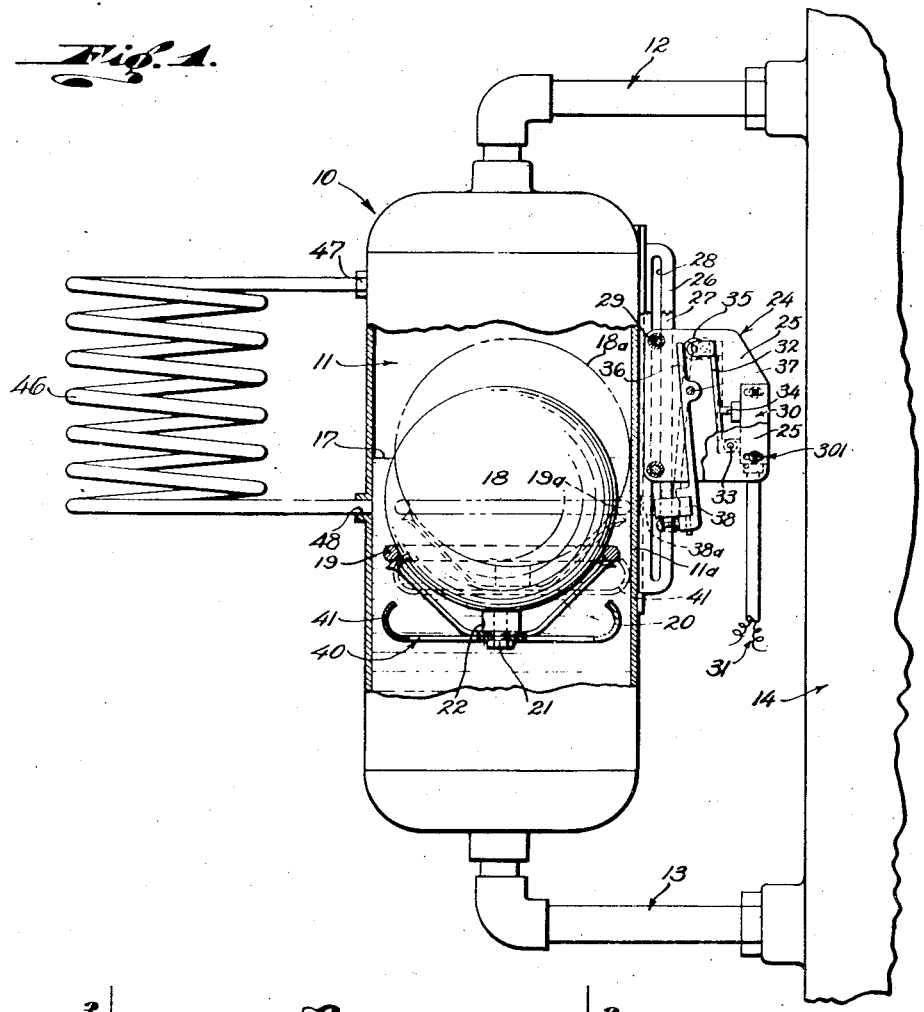
Fig. 1 is an elevation, partly in section, showing one embodiment of the invention.
Fig. 2 is a fragmentary sectional view illustrating a variational embodiment.
Fig. 3 is a reduced scale plan view of Fig. 2 taken on line 3—3.

In the assembly view of Fig. 1, the float control generally indicated at 10 is shown to comprise a vertically extending surge chamber 11, the walls of which, or at least the side wall, is made of suitable non-magnetic material. In the broad contemplation of the invention, the control 10 may be employed for various purposes and in different specific installations, requiring liquid level control. Typically, the chamber is shown to have top and bottom pipe connections 12 and 13 with the usual water column 14 connected with a boiler so that the water stands at a corresponding level in the surge chamber, column and boiler.

The chamber contains a spherical, fluid-tight, non-magnetic metal float 18, the size of which may be related to the chamber diameter in substantially the proportions illustrated. The float carries a magnetic (ferrous) metal element preferably in the form of a ring 19 submerged beneath the water and having its outer annular face or edge in substantial vertical alinement with the surface of the float at its maximum diameter. The ring 19 may be applied to the float in any suitable manner, as by a spider 20 bearing upwardly against the ring and removably attached by screw 21 to a boss 22 on the bottom of the float. As will appear, by virtue of the surface alinement of the float and ring, the float assembly will maintain its normal vertical position when the ring is attracted into engagement with the side wall 11a of the chamber. It will be observed that the float is submerged, as by internal loading, in the liquid to a depth bringing the liquid level 17 above the center or maximum diameter of the float. This provision is made for the purpose of stabilizing the float against excessive sensitiveness to the magnet attraction for the ring 19, yet leaving the float a degree of sensitivity and responsiveness permitting constant maintenance of the liquid close to its predetermined level.

The control assembly generally indicated at 24, may be carried on a suitable body structure, typically a pair of spaced plates 25, mounted for vertical adjustment on the side of the chamber 11. The latter may carry an appropriate bracket, spaced portions 26 and 27 which receive between them the plates 25 and have slots 28 to receive tightenable fasteners 29 inserted through the plate and slots.

Plates 25 carry between them a "Micro Switch"

30 in the circuit 31 of an electrical motor, not shown, driving a pump supplying water to the boiler 14. Lever 32 pivotally mounted at 33 on the switch, normally engages the movable switch operating part 34 to close the switch and maintain the feed water pump in operation. Lever 32 carries on its upper end a roller 35 engaged by lever 36 above its pivot 37, the lower bifurcated end of the lever carrying a permanent magnet 38. A set screw threaded into the arm, may be adjusted to project variable distances beyond the magnet 38, and therefore, upon engagement with the chamber wall, to correspondingly limit the approach of the magnet. This feature is of importance in that the sensitivity of the magnet influence on the float carried ring 19 may be varied to permit proper response of the magnet to the float position, and yet prevent the magnet attraction being so great as to interfere with movement of the float in exact or close response to the liquid level changes. The mounting of switch 30 may be accommodated to compensate for variation of the switch arm movements as a result of adjustments of screw 64, as by providing adjustable pin and slot connections 301 between the switch and plates 25. As will be observed, the center of gravity of the lever and magnet assembly is such that when the float carried ring 19 is outside the field of the magnet, the latter is swung outwardly in spaced relation to wall 11a of the chamber.

In considering the operation of the system, the boiler and chamber 11 may be assumed to be filling with water, with the float, as shown in solid lines, rising toward its normal position, i. e. the elevation corresponding to normal liquid level. As the float reaches the broken line position 18a, ring 19 enters the field of magnet 38 transmitted through the non-magnetic chamber wall 11a, and attracts the magnet assembly to the dotted line position 38a of engagement against the chamber wall, the resultant swinging of lever 36 actuating lever 32 to open the switch 30. Under the stated conditions, the magnetic metal ring 19, is attracted to the chamber wall as in the position indicated at 19a, the float consequently being displaced to the lateral position of 18a. As the water level falls, the float carries the ring 19 downwardly out of the magnet field, whereupon the magnet lever swings out to normal position, closing the switch 30.

Particular provision is made for preventing the float and ring assembly from delayed hanging against the chamber wall under the influence of the magnet, as the water level drops. The float carries a non-magnetic guide and contact breaker, typically in the form of a spider 40 retained by screw 21 and having a curved annular portion 41 in substantial alinement with the outer surfaces of the float and ring 19. Thus as the assembly is attracted by the magnet against the chamber wall, the latter is contacted at three points, respectively by the float, ring, and breaker. As the float carried assembly lowers from the normal broken line position shown, its tendencies are to either slide downwardly along the wall or break away from the chamber wall about the point of contact of the breaker 41 therewith, thus assuring proper release and obviating any tendency which otherwise the float and ring 19 alone might have to hang on the chamber wall, by reason of the ring remaining in the magnet field while the liquid level lowers. Breaker 41 effects this result by preventing pivoting of the float about the point of contact of the ring 19 and the wall adjacent the magnet, to thereby assure that no part of the float or ring can move downwardly without moving the part of the ring adjacent the magnet either away from the wall or downwardly.

Controls similar to the assembly at 24 may be used for the purpose of indicating changes of the water level to excessively high or low levels, as by the operation of signals.

Provision may be made for preventing such accumulations in the float chamber as boiler water scale and rust that might otherwise in the course of time interfere with proper operation of the control. A condenser coil 46 having a vapor connection at 47 with the chamber above the liquid level, and a return condensate connection at 48, serves to effect constant condensation of steam entering the coil, and a return to the chamber of distilled water in quantity sufficient to flush solid accumulations from the float assembly surfaces and chamber walls.

Fig. 2 illustrates a variational form of the invention adaptable particularly for installation in systems where the pressures might be so high as to collapse or deform a hollow float. Here the float 50 is made in solid cylindrical form of suitable non-magnetic material or metal which, broadly considered, may have a specific gravity greater or less than that of the liquid. Preferably I employ a metal slightly heavier than the liquid, and supplement the liquid buoyancy by light coil spring 51 attached to the top of the float and to the removable top 52 of the chamber by suitable connection 53. The spring tension may be predetermined to give known relationships between the liquid level and float submergence at different positions of the liquid level. The outer surface of the float has an annular recess 54 containing a magnetic metal ring 55 corresponding in function to previously described ring 19 and having its outer surface in alinement with the cylindrical face 56 of the float. While the switch and magnet assembly corresponds generally in structure and operation to the previously described mechanism 24, I have shown a variational form of mounting having the advantage of affording greater clearances for the magnet end of the arm. Here the switch 30a and associated levers are contained between side plates 25a attached at 60 to a clamp band 61 applied about the surge chamber and releasably tightened by fasteners 62 to permit vertical adjustment of the band and switch assembly. As shown in Fig. 2, the magnet end of the arm depends openly below its support.

Upon attraction of the ring 55 by the magnet 58, the float surfaces above and below the ring are brought to engage the non-magnetic chamber wall, and as the liquid level drops, the wall engagement of the float surface below the ring, serves the function of the previously described guide and breaker 40, in causing the float to follow the liquid level change and drop away from magnet-influenced engagement with the chamber wall.

I claim:

1. Liquid level control comprising a non-magnetic wall forming the side of a chamber containing liquid surging in contact with said wall, a float in said chamber; control mechanism mounted on the outside of said wall and comprising a depending pivoted arm, a magnet carried by said arm and normally swung away from the wall; and a horizontally positioned magnetic metal annulus carried by the float and acting to attract and move said magnet toward the wall of the chamber when the liquid reaches a predetermined level.

2. Liquid level control comprising a non-magnetic wall forming the side of a chamber containing liquid surging in contact with said wall, a float in said chamber; control mechanism mounted on the outside of said wall and comprising a depending pivoted arm, a magnet carried by said arm and normally swung away from the wall, an electric switch actuated by said arm, and means for adjusting the position of the arm and switch assembly vertically of said chamber; and a horizontally positioned magnetic metal annulus element carried by the float and acting to attract and move said magnet toward the wall of the chamber when the liquid reaches a predetermined level.

3. Liquid level control comprising a non-magnetic wall forming the side of a chamber containing liquid surging in contact with said wall, a solid non-magnetic float in said chamber control mechanism comprising a movable magnet at the outside of said wall, and a magnetic metal element carried by the float within a recess therein and at the outside thereof adjacent said wall, said element operating to actuate said magnet in accordance with changes of the liquid level in said chamber.

4. Liquid level control comprising a non-magnetic wall forming the side of a chamber containing liquid surging in contact with said wall, a solid non-magnetic float in said chamber, a spring resisting downward displacement of said float, control mechanism comprising a movable magnet at the outside of said wall, and a magnetic metal element carried by the float within a recess therein and at the outside thereof adjacent said wall, said element operating to actuate said magnet in accordance with changes of the liquid level in said chamber.

5. Liquid level control comprising a non-magnetic wall forming the side of a chamber containing liquid surging in contact with said wall, a solid cylindrical non-magnetic float in said chamber, control mechanism comprising a movable magnet at the outside of said wall, and an annular magnetic metal element carried by and extending about the float adjacent said wall, said element operating to actuate said magnet in accordance with changes of the liquid level in the chamber.

6. Liquid level control comprising walls forming a liquid surge chamber, a float in said chamber, a magnetic metal member carried by the float and positioned entirely below the liquid level in the chamber, a movable control element, and means operable by transmission of magnetic force through the closed side wall of said chamber at a diameter accommodating the float for actuating said element in accordance with changes of the elevation of said member in the chamber.

7. Liquid level control comprising a non-magnetic wall forming the side of a chamber containing liquid that surges in contact with said wall, a float in said chamber, a magnetic metal member carried by the float and positioned entirely below the liquid level in the chamber, a movable control element outside said chamber, and means operable by transmission of magnetic force through said wall at a diameter accommodating the float for actuating said element in accordance with changes of the elevation of said member in the chamber.

8. Liquid level control comprising a non-magnetic vertically extending wall at the side of a chamber and contacted by liquid surging within the chamber, a float in said chamber, a magnetic metal annulus carried by the float in a substantially horizontal plane below the liquid level in the chamber, a movable control element mounted on the exterior of said side wall, and means operable by transmission of magnetic force through said wall at a diameter accommodating the float for actuating said element in accordance with changes of the liquid level in said chamber.

9. Liquid level control comprising a non-magnetic wall forming the side of a chamber containing liquid surging in contact with said wall, a float in the chamber, a movable control element outside the chamber, a magnetic metal member extending at all times substantially horizontally about the float below the top thereof and operable by transmission of magnetic force through said wall at a diameter accommodating the float for actuating said element in response to changes of the liquid level in the chamber.

10. Liquid level control comprising a non-magnetic wall forming the side of a chamber containing liquid surging in contact with said wall, a float in said chamber, control mechanism comprising a movable magnet at the outside of said wall, a magnetic metal element carried by and extending horizontally about the float and operating to actuate said magnet in accordance with changes of the liquid level in said chamber, and means maintaining the float against turning so that said element maintains a substantially horizontal position.

11. Liquid level control comprising a non-magnetic wall forming the side of a chamber containing liquid surging in contact with said wall, a float ball in said chamber, control mechanism comprising a movable magnet at the outside of said wall, and an annular magnetic metal element carried by and below the top of the float, said element having smaller internal diameter than the float and assuming at all times a substantially horizontal position, and said element operating to actuate said magnet in accordance with changes of the liquid level in said chamber.

12. Liquid level control comprising a non-magnetic wall forming the side of a chamber containing liquid surging in contact with said wall, a free float structure in said chamber and including a magnetic metal element carried by said structure below the top thereof, said structure being engageable with the chamber wall at a location vertically offset from said element, a control element, and means operable by transmission of magnetic force through the closed side wall of said chamber at a diameter accommodating the float for actuating said control element in accordance with changes of the elevation of said magnetic element in the chamber.

13. Liquid level control comprising a non-magnetic wall forming the side of a chamber containing liquid surging in contact with said wall, a float free structure in said chamber and including a magnetic metal element carried by said structure entirely below the liquid level in the chamber and engageable with the side wall thereof, said structure being engageable with said side wall at a location vertically offset from said element, a control element, and means operable by transmission of magnetic force through said side wall of the chamber at a diameter accommodating the float for actuating said control element in accordance with changes in the elevation of said magnetic element in the chamber.

14. Liquid level control comprising walls forming a liquid surge chamber, a ball float within the chamber, an annular magnetic metal element carried by the float in horizontal position, means carried by the float and engageable against said wall to prevent hanging of the float on the wall when attracted thereto during lowering of the liquid level, said float being horizontally displaceable in the chamber and the wall contacting surfaces of said element and means being substantially in vertical alinement, and control means comprising a movable magnet at the outside of said wall and displaceable by said float carried element in accordance with its movement into and out of the field of the magnet transmitted through said chamber wall.

15. Liquid level control comprising walls forming a liquid surge chamber, a ball float within the chamber, an annular magnetic metal element carried by the float in horizontal position, means carried by the float below said element and engageable against said wall to prevent hanging of the float on the wall when attracted thereto during lowering of the liquid level, said float being horizontally displaceable in the chamber and the wall contacting surfaces of said element and means being substantially in vertically alinement, and control means comprising a movable magnet at the outside of said wall and displaceable by said float carried element in accordance with its movement into and out of the field of the magnet transmitted through said chamber wall.

16. Liquid level control comprising walls forming a liquid surge chamber, a ball float within the chamber, an annular magnetic metal element carried by the float below the liquid level in horizontal position, means carried by the float at the bottom thereof and engageable against said wall to prevent hanging of the float on the wall when attracted thereto during lowering of the liquid level, said float being horizontally displaceable in the chamber and the wall contacting surfaces of said element and means being substantially in vertical alinement, and control means comprising a movable magnet at the outside of said wall and displaceable by said float carried element in accordance with its movement into and out of the field of the magnet transmitted through said chamber wall.

JULIAN A. CAMPBELL.

REFERENCES CITED

The following references are of record in the file of this patent:

UNITED STATES PATENTS

| Number | Name | Date |
| --- | --- | --- |
| 382,515 | De Redon | May 8, 1888 |
| 384,200 | Ghegan | June 5, 1888 |
| 841,334 | Mower | Jan. 15, 1907 |
| 1,876,044 | Davis | Sept. 6, 1932 |
| 2,180,802 | Dillman | Nov. 21, 1939 |
| 2,181,829 | Jeffrey | Nov. 28, 1939 |
| 2,353,641 | Brockett | July 18, 1944 |

FOREIGN PATENTS

| Number | Country | Date |
| --- | --- | --- |
| 473,603 | Great Britain | Oct. 15, 1937 |